April 7, 1931.  E. WIECZOREK  1,800,036
HYDRAULIC BRAKE
Filed May 26, 1927  4 Sheets-Sheet 3

Inventor:

April 7, 1931.  E. WIECZOREK  1,800,036
HYDRAULIC BRAKE
Filed May 26, 1927   4 Sheets-Sheet 4

Inventor:
Emanuel Wieczorek

Patented Apr. 7, 1931

1,800,036

UNITED STATES PATENT OFFICE

EMANUEL WIECZOREK, OF LEIPZIG, GERMANY, ASSIGNOR TO RUDOLF KANDT, OF LEIPZIG, GERMANY

HYDRAULIC BRAKE

Application filed May 26, 1927, Serial No. 194,485, and in Germany June 1, 1926.

This invention relates to hydraulic braking arrangements in which a liquid pressure is produced by means of two pistons of different diameters operated by the driver through a common lever and working successively, said braking arrangement being specially designed for motor driven vehicles.

The brake, according to the invention, is distinguished from similar devices of known type in that the two pistons are moved in their cylinders successively by means of a common control-lever with positively changing pivot axles. It is consequently possible to exert, by means of the braking arrangement according to the invention, successively two independent pressure-actions upon the brake-pressure-conduit, whereby the power exerted by the person who brakes remains unaltered.

The hydraulic brake arrangement, according to the invention, presents the advantage that it can be built into any motor-driven vehicle without substantially altering the vehicle, and that it ensures a perfect braking-compensation so that the complicated brake compensating rigging, required for mechanically driven brakes, is suppressed.

Another advantage of the improved brake-mechanism is that, owing to the brake-lever mounted with variable pivot-axle, no other transmission-lever-arms are required. In the accompanying drawings a form of construction of an hydraulic four-wheel-brake, according to the invention, is shown:

Figure 3:
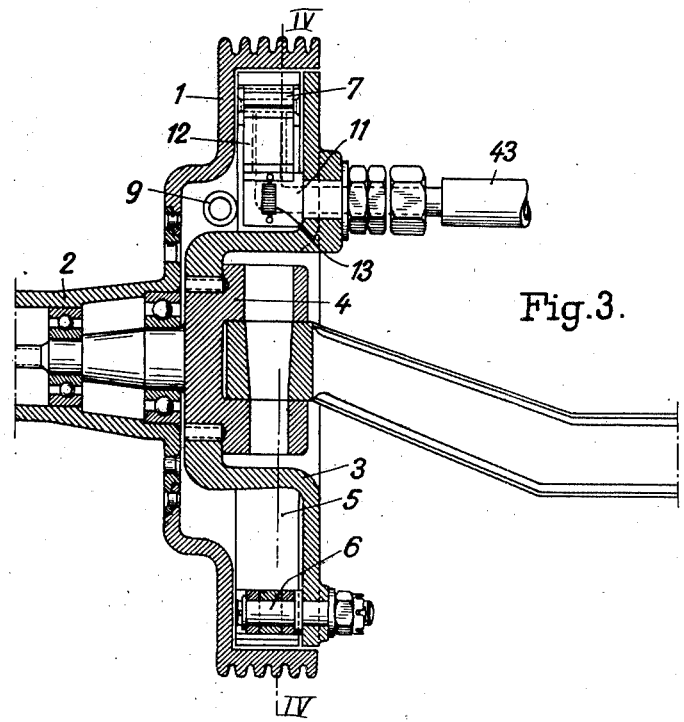
Fig. 3 shows in axial section a steering swivel journal and a brake-drum of a front-wheel-axle.
Figure 4:
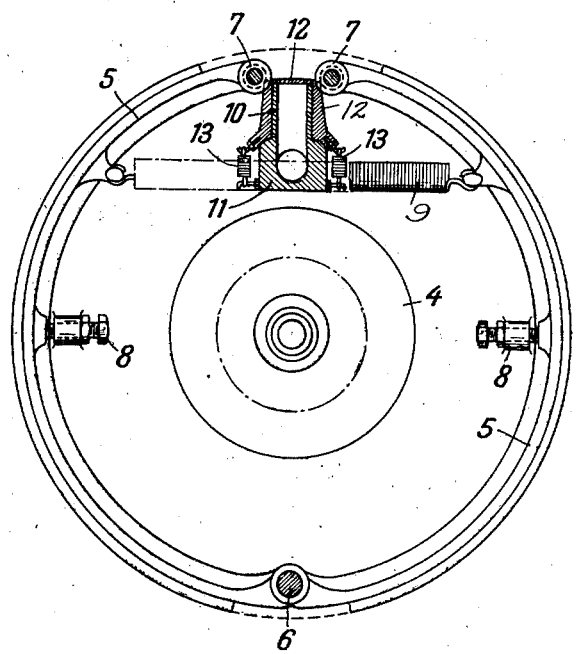
Fig. 4 is a section on line 4—4 of Fig. 3, and shows how the brake-blocks and the wedge-shaped cylinder are arranged in the brake-drum.

The brake-drum 1 (Figs. 3 and 4) is made as usual in one piece with or riveted to the wheel-hub 2. In the drum 1 the carrier 3 for the brake-blocks is fixed on the steering-swivel by screw-connection and connected to the steering swivel journal 4. The brake-block carrier 3 carries the brake-blocks 5 which are joined in the joint 6 (Fig. 4) and have on their free ends pressing rollers 7. The brake-blocks 5 are adjustable by means of adjusting screws 8 and they are pulled the one towards the other, i. e. away from the brake drum 1, by the action of a spiral-spring 9. On a wedge-shaped cylinder 12 projecting between the ends of the brake blocks 5 the pressing rollers 7 of said brake-blocks 5 bear strongly. The cylinder 12 is carried by a hollow piston 11, slidably mounted therein and held against said cylinder by means of springs 13. The piston 11 communicates with the brake pressure pipe so that the wedge shaped cylinder 12 is lifted by the pressure-liquid flowing into the piston 11 and driven between the pressing rollers 7 of the brake blocks 5. The brake blocks 5 are thus spread and pressed onto the brake drum 1. The springs 13 serve to return the wedge shaped cylinder 12 into its initial position after the braking. The arrangement hereinafter described serves for carrying out the braking-action which has just been described and which is substantially known.

Figure 5:
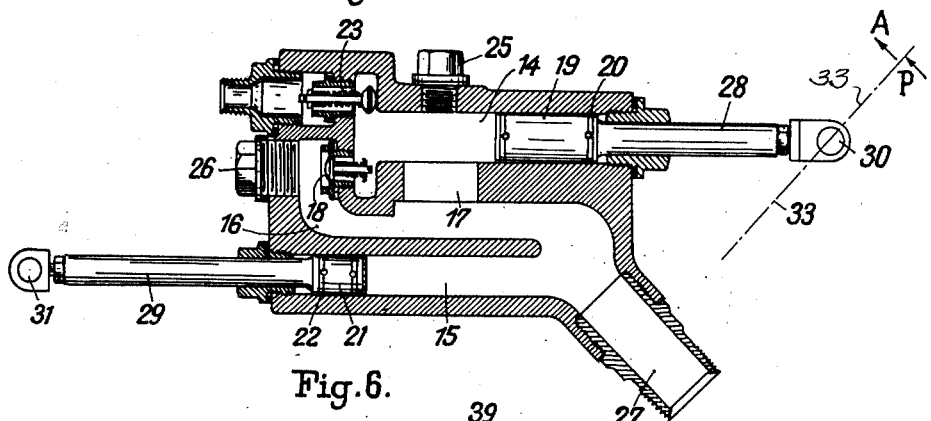
Fig. 5 shows in longitudinal section the cylinder arrangement.

The cylinder-block, shown in Fig. 5 in section, is composed of a main cylinder 14 and of an auxiliary cylinder 15, said cylinders communicating the one with the other by an overflow-channel 16. This overflow-channel 16 is connected to the main-cylinder 14 on the one hand by a lateral passage 17 and on the other hand by an overflow valve 18. A main-piston 19 is arranged in the main-cylinder 14 and an auxiliary-piston 21 in the auxiliary cylinder 15, said pistons having piston-rings 20, 22 respectively.

On one end of the main-cylinder 14 a fresh-oil valve 23 is arranged which, in the state of rest, is open and places the cylinder 14 in communication with a suitable reservoir for the production of the pressure-liquid.

A screw 25 closes the oil-inlet.

Figure 1:
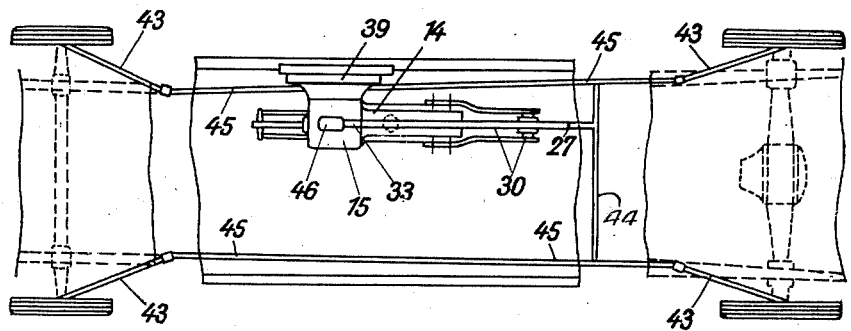
Fig. 1 is a diagrammatical plan view of the total arrangement.
Figure 2:
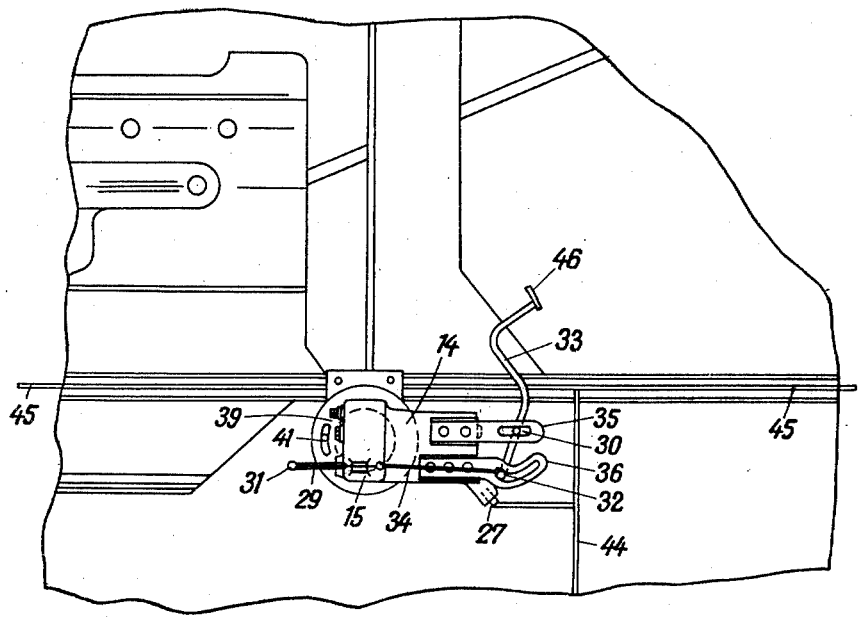
Fig. 2 shows the improved brake-arrangement in side elevation.
Figure 6:
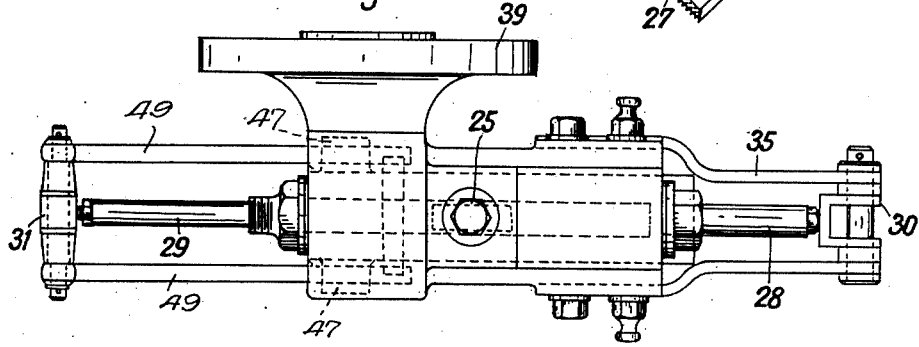
Fig. 6 is an elevation of the cylinder-block and of the piston-rigging, according to Fig. 5.

The overflow-valve 18 is accessible when a screw-stopper 26 has been removed. The brake-pressure-conduit 27 connected to the discharge-tube of the cylinder-block is connected, by means of the pipes 44, 45 and 43 shown in Fig. 1, with the brake-cylinders of the several wheels. The piston-rod 28 of the main-piston 19 is connected by a pin 30 to a control-lever 33 which has a pedal-plate 46. The piston-rod 29 of the auxiliary piston 21 is connected by a pin 31 to which two connecting rods 49 guided in guides 47 (Fig. 6) are hinged, the other ends of these rods 49 being hingedly connected at 48 to rods 34, the other end of said rods 34 being hingedly connected by a pin 32 to the corresponding ends of the control-lever 33.

Figure 7:
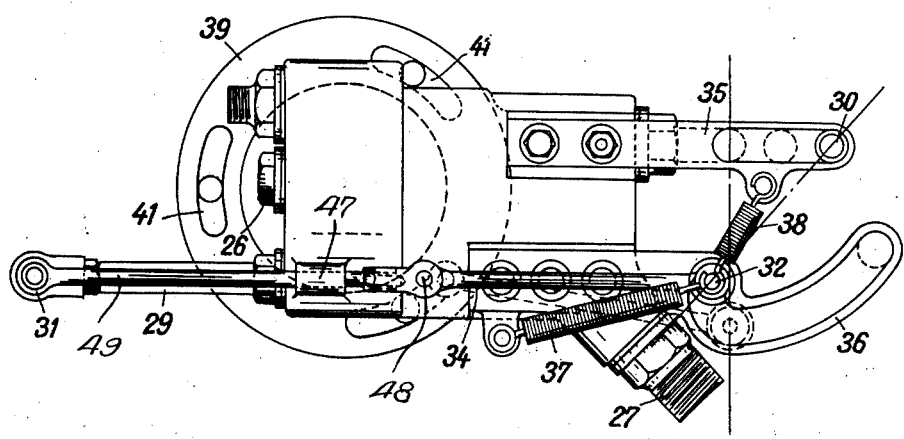
Fig. 7 shows in side elevation the piston-casing and the guides for the connecting studs which connect the pistons with the control-lever.
Figure 8:
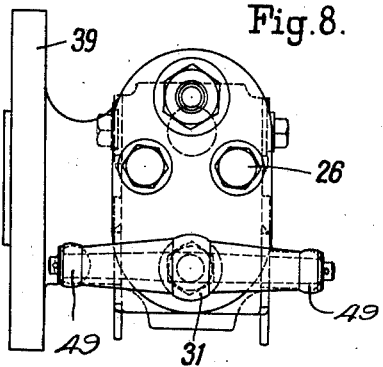
Fig. 8 is a front elevation.

Guides 35 and 36 (Fig. 7) are arranged on the end-face of the cylinder-block which is turned towards the control-lever 33, and designed to guide the hinge-pins of the two pistons 19 and 21. The guide 35 guides the pin 30 of the main-piston 19 and is straight, while the guide 36 for the pin 32 of the auxiliary-piston 21 is curved. The pin 32 of the auxiliary-piston 21 is connected to the cylinder block by pull-strings 37 and to the guide 35 by pull-springs 38 which serve to return the control-lever into its position of rest.

Figure 9:
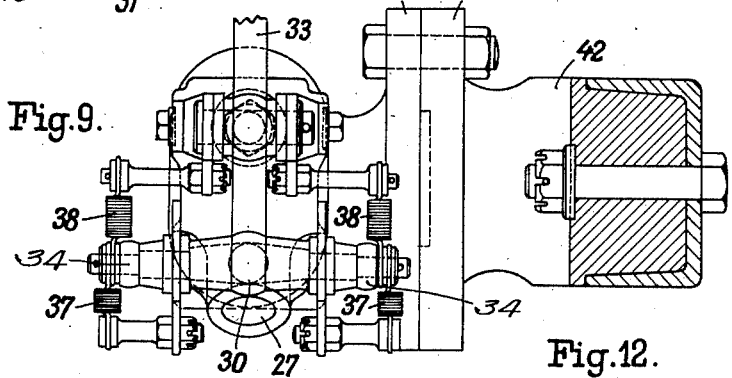
Fig. 9 is a rear elevation of Figs. 5–7.

A flange 39 is cast on the cylinder-block and adapted to be connected with a flange 40 by means of screws in slots 41. The flange 40 is mounted on its bearing-block 42 (Fig. 9) adapted to be fixed by screws on the vehicle-frame. The bearing-block 42 permits of mounting the brake-device in a simple manner on any motor driven vehicle, while the screw and slot connection 41 of the two flanges 39 and 40 permits of adjusting the brake-lever 33 to the position which is the most favourable one for the attendance.

The operation of the hydraulic brake arrangement, according to the invention, is as follows:—

When the driver desires to brake the vehicle he depresses the control-lever 33 by the pedal plate 46 so that the exerted force acts upon the control-lever 33 indicated in Fig. 5 in dash-dot-line in the direction of the arrow-line P and makes it oscillate in the direction of the arrow-line A in anticlockwise direction.

Figure 10:
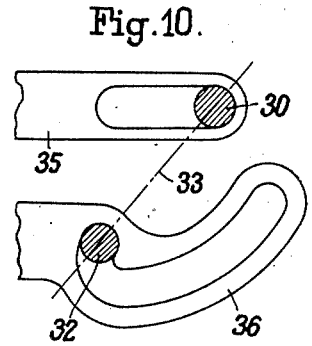
Figs. 10 to 14 illustrate the different positions which the control-lever adopts under the progressing action of the force of the braking person and various positions of the pivot-point of the control-lever.
Figure 11:
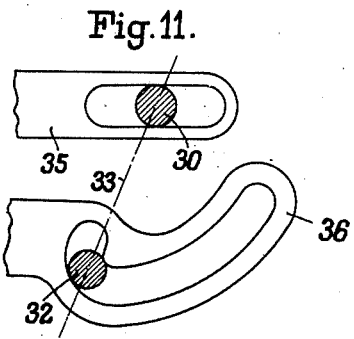

The control-lever 33 which, in the position of rest, is in the position diagrammatically shown in Fig. 10, oscillates around the pivot-pin 32 and shifts the main-piston 19 to the left in Fig. 5. The liquid contained in the main-cyinder 14 is consequently compressed, so that the valve 23 closes and the pressure-liquid flows through passage 17 into the over-flow-channel 16 and out through pipe 27, according to the progressing movement of piston 19. As soon as the main-piston 19 closes the passage 17, the overflow-valve 18 opens under the increased pressure, and the compressed liquid flows from the pressure-space of the main-cylinder 14 through the valve 18 into the over-flow-channel 16. The pressure exerted by the end-face of the main-piston 19 acts thereby through the passage 17 upon the side surfaces of the main-piston 19 and assists the inertia of the main-piston in its extreme position. During the moving of the piston into its left extreme position in Fig. 5, the connecting pin 30 has moved in its guide 35 through the position shown in Fig. 11 into the position shown in Fig. 12. The pressure-liquid forced into the brake-pressure-pipe 27, has acted through the several pipes 44, 45, 43 upon the pistons 11 of the several wheels in such a manner that the wedge-shape cylinders 12 have been slightly lifted. Any clearances which might exist between the several brake-blocks, and the drum have thus been overcome so that all the brake-blocks 5 are now pressed at the same strength on their brake-drum.

Figure 12:
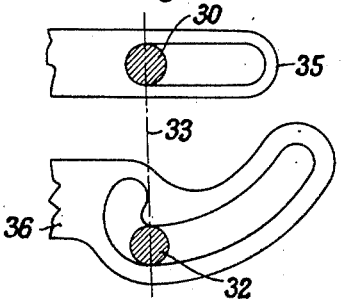
Figure 14:
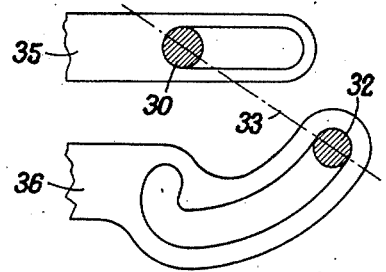

The auxiliary-piston 21 has in the meantime executed only a slight displacement in the direction opposite that of the main-piston 19, whereby a pressure is produced which is sufficient to close the overflow-valve 18. During this short forward stroke of the auxiliary-piston 21, at which the overflow-valve 18 has been closed, the connecting-pin 32 has moved in its guide 36 into the position shown in Fig. 12. The connecting-pin 30 of the main-piston 19, which has arrived at its left extreme position, butts onto the left end of its guide-bar 35 (Fig. 12). When the braking-force of the driver continues to act upon the control-lever 33, this lever is further oscillated, but turns now as a two-armed-lever around this pivot-pin 30 which is bearing against the left end of its guide 35, as can be seen from Fig. 13. The connecting pin 32 of the auxiliary-piston 21 moves further to the right in its curved guide 36 as shown in Fig. 14. When the brake blocks are entirely worn out the lever 33 will finally arrive in the extreme position in which the connecting pins 30 and 32 abut against the ends of their respective guides 35 and 36 (Fig. 14).

Figure 13:
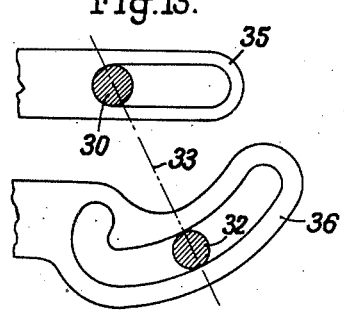

During the transition of the brake-lever 33 from the position shown in Fig. 12 into the position shown in Fig. 13 or 14, the main-piston 19 remains at rest in its left extreme position and maintains closed the valve 23 and the lateral passage 17, the overflow-valve 18 being maintained closed by the pressure exerted by the auxiliary-piston 21.

The auxiliary-piston 21 according to the force acting upon the brake-lever 33, then executes its pressure-stroke in the direction opposite to the direction of movement of the main-piston 19 and produces a braking-pressure, acting upon the brake-pressure-pipe 27 and the several wedge-shaped cylinders 12. By the wedging action of the brake-toggles 10, which are driven between the pressing-rollers 7 of the brake-blocks 5, these brake-blocks 5 are pressed with increasing force on their brake-drums 1 so that the braking-action increases.

After the braking the driver releases the pedal 46 of the control-lever 33 so that this lever is returned, by the action of the springs 37 and 38, into its position of rest shown in Figs. 5 and 10. The control-lever 33, through the intermediary of the rigging 28, 29, 34, forces the main-piston 19 and the auxiliary-piston 20 to return into their initial positions, the valve 23 and the passage 17 being opened again.

I claim:—

A hydraulic brake arrangement specially for motor driven vehicles, comprising in combination with a pressure-liquid pipe, two cylinders of different diameters, two pistons of different diameters one in each cylinder, a control-lever operated by the driver, a hinge pin on the piston of greater diameter, a straight guide for said hinge pin, a hinge pin on the piston of smaller diameter, and a curved guide for said hinge pin of the piston of smaller diameter, said hinge pins serving as pivots for said control lever which successively operates said two pistons to produce a liquid pressure.

In testimony whereof I affix my signature.

EMANUEL WIECZOREK.